(12) United States Patent
Celso De Almeida Mattos

(10) Patent No.: US 6,186,425 B1
(45) Date of Patent: Feb. 13, 2001

(54) FOOD-PROCESSOR ACCESSORY HAVING A SAFETY MEMBER

(75) Inventor: Afonso Celso De Almeida Mattos, Sao Caetano do Sul (BR)

(73) Assignee: U.S. Philips Corporation, New York, NY (US)

( * ) Notice: Under 35 U.S.C. 154(b), the term of this patent shall be extended for 0 days.

(21) Appl. No.: 09/422,738

(22) Filed: Oct. 21, 1999

(30) Foreign Application Priority Data

Oct. 23, 1998 (EP) .................................................. 98203582

(51) Int. Cl.⁷ .................................................. A47J 43/046
(52) U.S. Cl. .................... 241/37.5; 241/100; 241/199.12
(58) Field of Search .............................. 241/37.5, 199.12, 241/100

(56) References Cited

U.S. PATENT DOCUMENTS

| | | | |
|---|---|---|---|
| 3,596,692 | * | 8/1971 | Swanke ............................ 241/199.12 |
| 3,612,126 | * | 10/1971 | Emmons et al. ................. 241/199.12 |
| 4,598,874 | * | 7/1986 | Barnett ................................ 241/37.5 |
| 4,685,625 | * | 8/1987 | Mazza ..................................... 241/36 |
| 4,799,626 | * | 1/1989 | Hickel et al. ........................ 241/37.5 |

FOREIGN PATENT DOCUMENTS

3225591C1   10/1983   (DE) .

* cited by examiner

*Primary Examiner*—John M. Husar
(74) *Attorney, Agent, or Firm*—Ernestine C. Bartlett

(57) ABSTRACT

The invention relates to a food-processor accessory (13) comprising a container (15), a rotatable tool (23), a support (21) for the tool, and a coupling member (27) by means of which the tool can be coupled to a drive member (9) which is arranged in a main housing (1) of a food processor, the container being detachably coupled to the support. According to the invention, the accessory is provided with a safety member (31) and a locking device (33), which co-operates with said safety member. The safety member can be displaced relatively to the coupling member from a first position, in which the safety member prevents the coupling member from being coupled to the drive member, to a second position, in which the safety member allows the coupling member to be coupled to the drive member, the locking device locking the safety member in its first position when the container is uncoupled from the support and releasing the safety member when the container is coupled to the support. Thus, it is prevented that the tool can be driven by the drive member when the container is not coupled to the support, so that the user of the accessory cannot be injured by the rotating tool. In a preferred embodiment, the safety member is annular and completely surrounds the coupling member in its first position.

17 Claims, 5 Drawing Sheets

FOOD-PROCESSOR ACCESSORY HAVING A SAFETY MEMBER

BACKGROUND OF THE INVENTION

The invention relates to an accessory for a food processor, which accessory is provided with a tool, a support in which the tool is rotatably journalled, a coupling member by means of which the tool can be coupled to a drive member of the food processor, and a container which is detachably coupled to the support.

The invention also relates to a food processor comprising an accessory in accordance with the invention.

An accessory and a food processor of the types mentioned in the opening paragraphs are generally known and widely used. The known accessory can suitably be used to subject ingredients present in the container, such as vegetables, fruit or meat, to a processing operation such as cutting, chopping or mixing, for which purpose the accessory can be coupled to a housing of the food processor, and the tool can be driven by the drive member of the food processor. The container and the support jointly constitute a closed chamber for the tool and the ingredients, so that in operation soiling of the environment of the food processor is precluded. The container can be detached from the support so as to enable the support and the container to be cleaned and/or introducing and removing ingredients.

A drawback of the known accessory resides in that said accessory can also be coupled to the housing of the food processor if the container is not coupled to the support. When the accessory is coupled to the housing of the food processor, also the coupling member of the accessory is coupled to the drive member of the food processor, so that the tool of the known accessory can be driven by the drive member of the food processor when the container is not coupled to the support, as a result of which a user of the food processor may be injured by the rotating tool.

SUMMARY OF THE INVENTION

It is an object of the invention to provide an accessory and a food processor of the types mentioned in the opening paragraph, in which the above-mentioned drawback of the known accessory and the known food processor are prevented.

To achieve this, the accessory in accordance with the invention is characterized in that the accessory is provided with a safety member and a locking device which co-operates with said safety member, the safety member being displaceable relatively to the coupling member from a first position, in which the safety member precludes coupling of the coupling member to the drive member, to a second position in which the safety member permits coupling of the coupling member to the drive member, while the locking device locks the safety member in its first position if the container is uncoupled from the support, and releases the safety member if the container is coupled to the support. If the container is uncoupled from the support, the locking device locks the safety member in its first position in which the safety member precludes coupling of the coupling member to the drive member. In its first position, the safety member is arranged relatively to the coupling member, for example, in such a manner that the coupling member cannot contact the drive member of the food processor. If the container is coupled to the support, the locking device releases the safety member, so that the safety member can be displaced to its second position, for example manually or by contact with the housing of the food processor, in which second position the safety member permits coupling of the coupling member to the drive member. As a result, the tool can only be driven by the drive member of the food processor if the container is properly coupled to the support, so that a user of the food processor cannot be injured by the rotating tool. A particular advantage of the accessory in accordance with the invention resides in that all parts, which are necessary according to the invention to achieve the above-mentioned object, are arranged on the accessory, while the food processor to which the accessory can be coupled does not require special adaptations. By virtue thereof, the accessory in accordance with the invention can suitably be coupled to existing food processors.

A particular embodiment of an accessory in accordance with the invention is characterized in that the safety member is annular and surrounds the coupling member, said safety member being displaceable, in a direction parallel to an axis of rotation of the coupling member, from its first position to its second position. In this particular embodiment, the safety member is given a very practical construction, whereby, in the first position of the annular safety member, the coupling member is entirely surrounded by the annular safety member, and in the second position of the annular safety member, the coupling member projects from the safety member. If the user of the food processor tries to couple the accessory to the housing of the food processor, the safety member comes into contact with said housing. If the container is not coupled to the support, the safety member is locked in its first position, so that the coupling member remains surrounded by the safety member and cannot be coupled to the drive member. If, however, the container is coupled to the support, the safety member can be displaced, either manually or by contact with the housing of the food processor, in a direction parallel to the axis of rotation of the coupling member, to its second position, so that the coupling member can be coupled to the drive member of the food processor.

A further embodiment of an accessory in accordance with the invention is characterized in that the locking device is provided with a closing member, which can be displaced relatively to the support, by a user of the accessory, from a first position in which the container can be detached from the support to a second position in which the closing member couples the container to the support, and a locking element which is provided on the support to co-operate with the safety member, said safety member being displaceably guided, relatively to the closing member, between its first position and its second position, while the locking element locks the safety member in its first position if the closing member is in the first position, and releases the safety member if the closing member is in the second position. By displacing the closing member from its first position to its second position, the user can couple the container to the support. Since the safety member is displaceably guided relatively to the closing member and co-operates, in the manner described above, with the locking element, the desired locking of the safety member in its first position if the container is not coupled to the support, is achieved in a practical and reliably manner.

Yet another embodiment of an accessory in accordance with the invention is characterized in that the locking device is provided with a further locking element which, with respect to the closing member, can be displaced from a first position, in which the further locking element locks the locking member in its first position, to a second position, in which the further locking element releases the closing member, the further locking element co-operating with a displacement element provided on the container, which displacement element displaces the further locking element to its second position if the container is in a position relative to the support in which the container can be coupled to the support by means of the closing member. By using the further locking element and the displacement element, it is achieved that the closing member can only be displaced to its second position by the user of the accessory if the container is in a position, with respect to the support, in which the container can be properly coupled to the support. In this manner, it is precluded that the user can release the safety member, either intentionally or unintentionally, by displacing the closing member, if the container is not properly arranged with respect to the support.

A particular embodiment of an accessory in accordance with the invention, in which, between its first position and its second position, the annular safety member is displaceably guided relatively to the closing member, in a direction parallel to the axis of rotation of the coupling member, is characterized in that, between its first position and its second position, the closing member is rotatably guided, with respect to the support, about the axis of rotation of the coupling member; while the locking element includes a cam which is provided with a profile which extends in a tangential direction with respect to the axis of rotation and extends obliquely with respect to said tangential direction. In this manner, a practical construction of the locking device of the accessory is obtained. Since the safety member is displaceably guided relatively to the closing member in a direction parallel to the axis of rotation of the coupling member, the safety member is coupled, viewed in the direction of rotation of the closing member, to the closing member. By virtue thereof, the user of the accessory can couple the container to the support by rotating the annular safety member about the axis of rotation of the coupling member.

These and other aspects of the invention will be apparent from and elucidated with reference to the embodiments described hereinafter.

DESCRIPTION OF THE PREFERRED EMBODIMENTS

Figure 1:
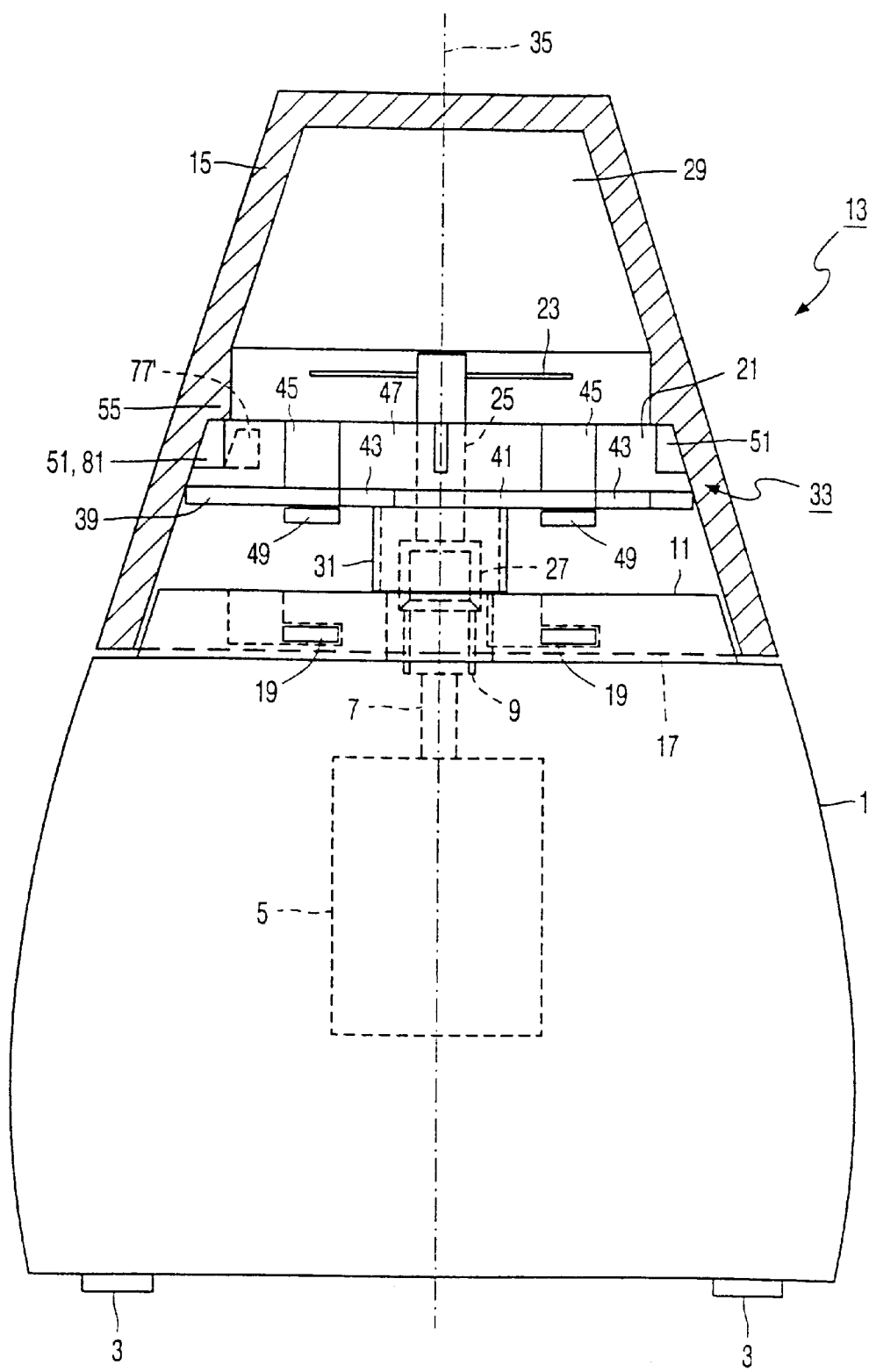
FIG. 1 diagrammatically shows a food processor in accordance with the invention, which is provided with an accessory in accordance with the invention, FIG. 2 diagrammatically shows the accessory of the food processor shown in FIG. 1.

FIG. 1 shows a food processor in accordance with the invention which comprises a synthetic resin housing 1 which can be placed on a surface by means of a number of bases 3. Said housing 1 accommodates an electric motor 5 which is provided with a motor shaft 7 to which a drive member 9 is secured. An accessory 13 in accordance with the invention can be arranged on an upper side 11 of the food processor. Said accessory 13 includes a cup-shaped container 15 which is made of a transparent synthetic resin and can be coupled, near a lower side 17, to the housing 1 of the food processor by means of a bayonet coupling 19. In the container 15, there is a synthetic resin support 21 in which a metal tool 23, such as a cutting tool, chopping tool or mixing tool, is rotatably journalled. Said tool 23 is secured, via a bearing shaft 25, to a coupling member 27 by means of which the tool 23 can be coupled to the drive member 9 of the food processor. The support 21 can be detached from the container 15 in a manner which will be described in greater detail hereinbelow, so that a chamber 29 formed in the accessory 13 by the container 15 and the support 21 is accessible for introducing ingredients, removing processed ingredients, and cleaning the container 15, the support 21 and the tool 23.

Figure 2:
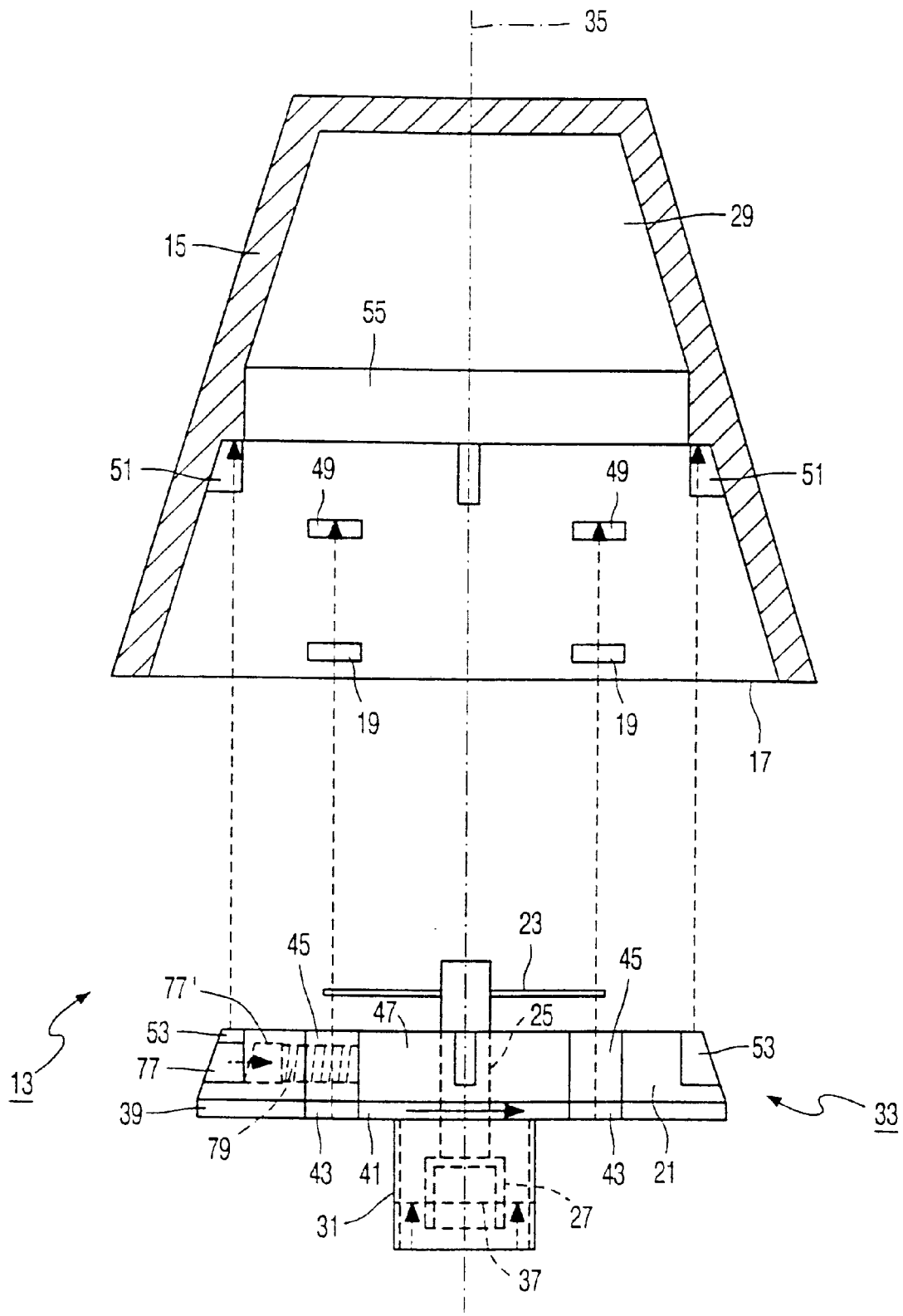
Figure 3:
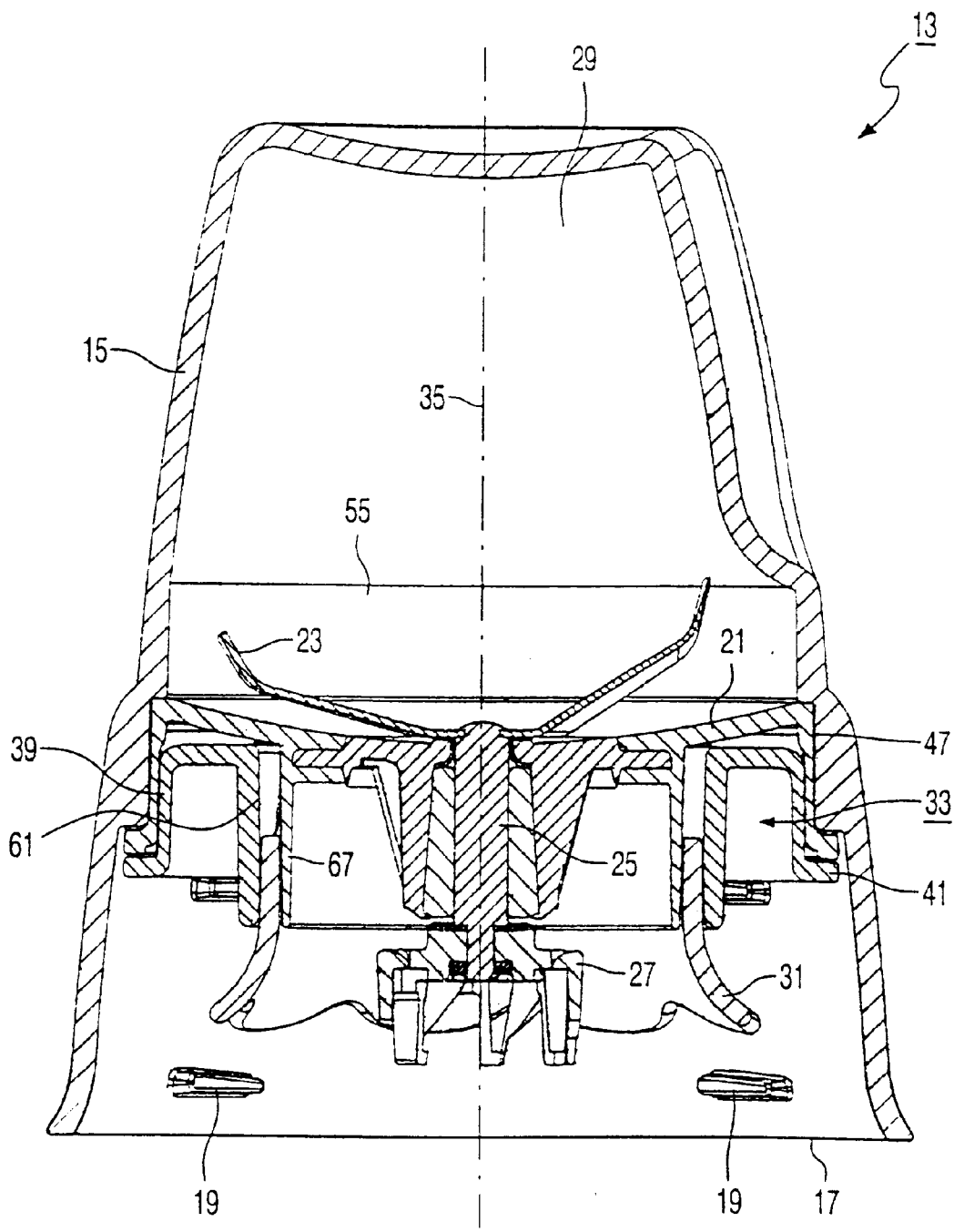
FIG. 3 is a sectional view of the accessory shown in FIG. 2.

In accordance with the invention, the accessory 13 is provided with a safety member 31 and a locking device 33 which co-operates with said safety member 31, so as to preclude, in a manner which will be described in greater detail hereinbelow, that the coupling member 27 of the accessory 13 can be coupled to the drive member 9 of the food processor if the container 15 is not properly coupled to the support 21. In this manner, it is precluded that the tool 23 can be driven by the drive member 9 if the container 15 is not, or not properly, coupled to the support 21, so that the tool 23 can only be driven by the drive member 9 if the chamber 29 is properly closed, and a user of the food processor and the accessory 13 cannot be injured by the rotating tool 23. As shown in FIGS. 1, 2 and 3, the safety member 31 shown in this embodiment is annular, and it surrounds the coupling member 27. In a state shown in FIG. 2, in which state the container 15 is uncoupled from the support 21, the annular safety member 31 is in a first position in which the safety member 31 entirely surrounds the coupling member 27 which is in a withdrawn position in the safety member 31. In the state shown, the safety member 31 is locked in its first position by means of the locking device 33, in a manner which will be described in greater detail hereinbelow. If, in this state, the user wants to couple the coupling member 27 to the drive member 9 of the food processor, the safety member 31 contacts the upper side 11 of the housing 1. Since the safety member 31 is locked in its first position, the coupling member 27 remains entirely surrounded by the safety member 31, so that the safety member 31 precludes coupling of the coupling member 27 to the drive member 9 of the food processor. If the container 15 is properly coupled to the support 21, the locking device 33 releases the safety member 31 in a manner which will be described in greater detail hereinbelow, and the coupling member 27 can be displaced, either manually or by contact with the upper side 11 of the housing 1, in a direction parallel to a common axis of rotation 35 of the tool 23 and the coupling member 27, from the first position to a second position, which is indicated in FIG. 2 by means of an interrupted line 37. In the second position of the safety member 31, the coupling member 27 is only partly surrounded by the annular safety member 31, and the coupling member 27 projects from the safety member 31, so that the safety member 31 allows coupling of the coupling member 27 to the drive member 9 of the food processor. The coupling member 27 can now be coupled to the drive member 9 of the food processor by coupling the container 15 with the support 21 coupled therein, as shown in FIG. 1, to the housing 1 by means of the bayonet coupling 19.

As schematically shown in FIGS. 1 and 2, the locking device 33 of the accessory 13 includes a closing member 39 for coupling the container 15 to the support 21. With respect to the support 21, the closing member 39 is rotatably journalled about the axis of rotation 35 between a first position shown in FIG. 2 and a second position shown in FIG. 1. An outer wall 41 of the closing member 39 is provided with a number of regularly spaced recesses 43 which, in the first position of the closing member 39, viewed parallel to the axis of rotation 35, are situated in line with a corresponding number of recesses 45 formed in an outer wall 47 of the support 21. As shown in FIG. 2, in the first position of the closing member 39, the support 21 can be placed in the container 15 by sliding the recesses 43 and 45 over a number of projections 49 on the inner wall of the container 15, the number of projections 49 corresponding to the number of recesses 43 and 45. As a result thereof, a number of positioning elements 51 provided on the inner wall of the container 15 is placed in a number of recesses 53, corresponding to the number of positioning elements 51, which recesses 53 are formed in the outer wall 47 of the support 21. The support 21 can subsequently be coupled to the container 15 by rotating the closing member 39 relatively to the support 21 from the first position to the second position, thereby causing the support 21 with the closing member 39 to be retained between the projections 49 and a retaining ring 55 provided on the inner wall of the container 15, as shown in FIG. 1.

Figure 4:
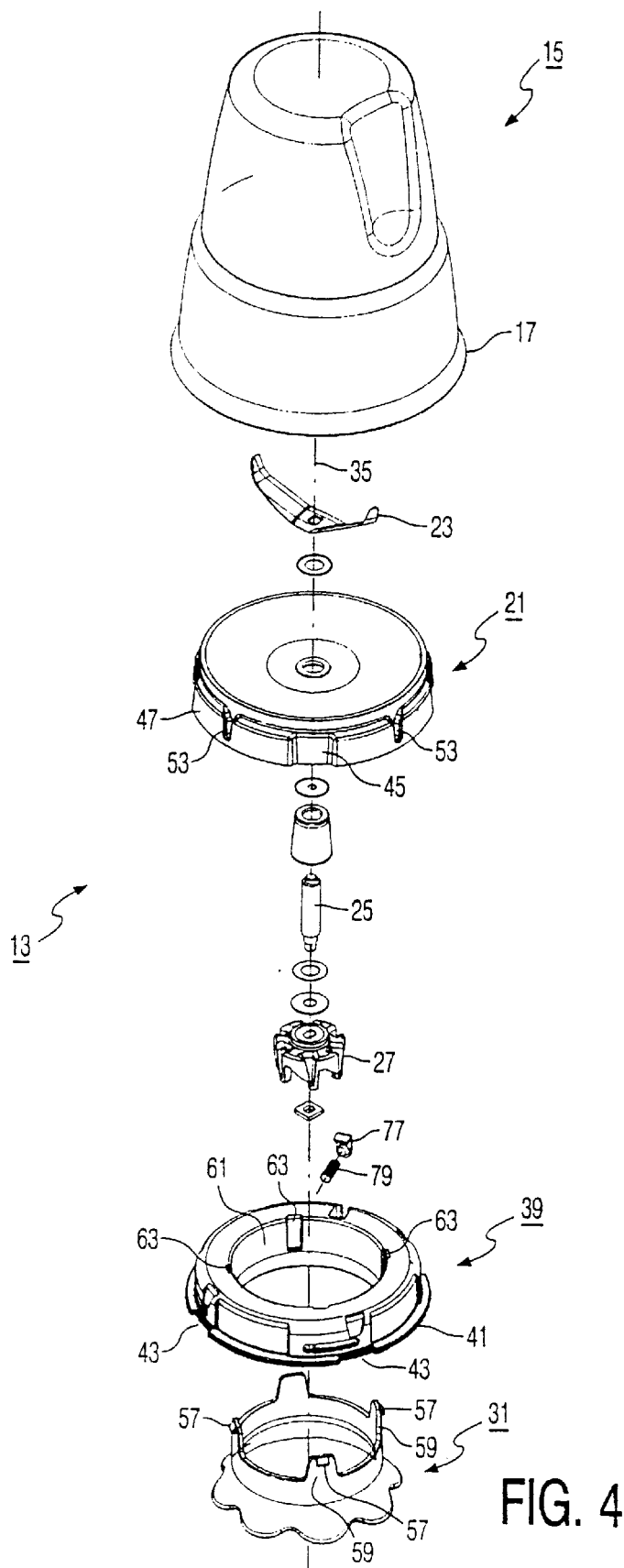
FIG. 4 shows a number of parts of the accessory shown in FIG. 2.
Figure 5A:
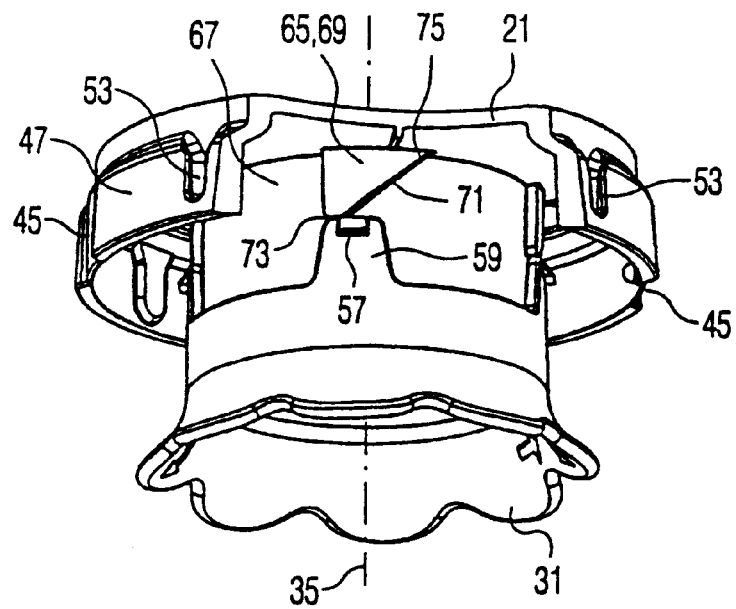
FIG. 5a shows a support and a safety member of the accessory shown in FIG. 2, the safety member being depicted in a first position.
Figure 5B:
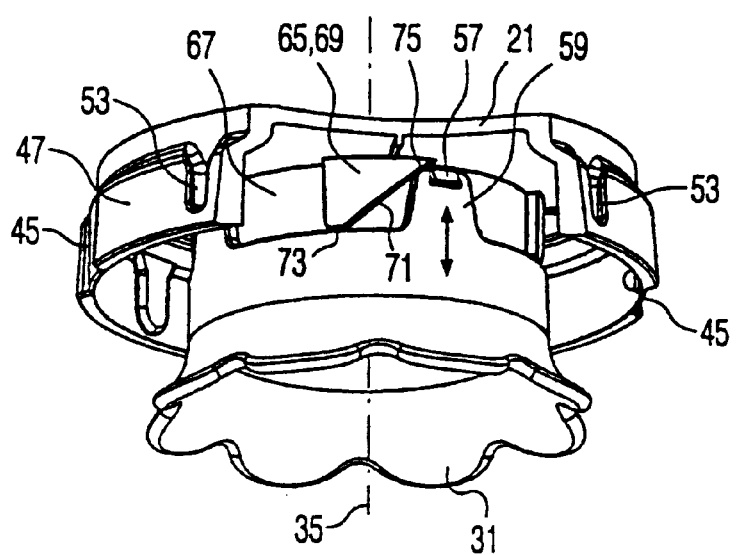
FIG. 5b shows the support and the safety member of the accessory shown in FIG. 2, the safety member being depicted in a second position.

As shown in FIGS. 4, 5a and 5b, the annular safety member 31 includes a number of guiding projections 57 which are each provided on a separate tongue 59 of the safety member 31. By means of the guiding projections 57, said safety member 31 is displaceably guided, relatively to the closing member 39, between its first position and its second position, an inner wall 61 of the closing member 39 being provided, for this purpose, with a number of guiding channels 63 which extend parallel to the axis of rotation 35, and which serve to co-operate with the guiding projections 57, as shown in FIG. 4. By using the guiding projections 57 and the guiding channels 63, the safety member 31, viewed in the direction of rotation of the closing member 39, is coupled to the closing member 39. By virtue thereof, it is achieved that the closing member 39 can be rotated by the user between its first position and its second position by rotating the safety member 31 about the axis of rotation 35 of the coupling member 27. By virtue thereof, the support 21 can be coupled in a practical manner to the container 15 by rotating the safety member 31.

As is further shown in FIGS. 5a and 5b, the tongues 59 of the safety member 31 each co-operate with a locking element 65 of the locking device 33. The locking elements 65 are provided on an inner sleeve 67 of the support 21 and each include a cam 69 which is provided with a profile 71 which, with respect to the axis of rotation 35, extends in a tangential direction and is positioned obliquely relatively to said tangential direction. In the state shown in FIG. 5a, the closing member 39 is in its first position in which the support 21 can be detached from the container 15. Since the safety member 31, viewed in the direction of rotation of the closing member 39, is coupled to said closing member 39, the tongues 59 of the safety member 31 bear against a first end 73 of the profiles 71, in the first position of the closing member 39, so that the safety member 31 is locked in its first position by the locking elements 65. In the state shown in FIG. 5b, the closing member 39 is in its second position in which the support 21 is coupled to the container 15. Since the safety member 31, viewed in the direction of rotation of the closing member 39, is coupled to said closing member 39, the tongues 59 of the safety member 31 can be displaced, in the second position of the closing member 39, in a direction parallel to the axis of rotation 35 until they contact a second end 75 of the profiles 71, so that the locking elements 65 release the safety member 31 and said safety member 31 can be displaced, parallel to the axis of rotation 35, between its first position and its second position.

As diagrammatically shown in FIGS. 1 and 2, the locking device 33 of the accessory 13 finally includes a further locking element 77 which can be displaced relatively to the closing member 39 from a first position shown in FIG. 2 to a second position 77', which is represented by means of an interrupted line in FIGS. 1 and 2. In the first position shown in FIG. 2, which is the position of the further locking element 77 if the container 15 is detached from the support 21, the further locking element 77 is situated in one of the recesses 53 in the outer wall 47 of the support 21 under the influence of a pretension induced by a mechanical spring 79. As a result, the further locking element 77 locks the closing member 39, relatively to the support 21, in its first position, so that also the safety member 31 is locked in its first position. In the state shown in FIG. 1, the container 15 is properly arranged on the support 21, the positioning elements 51 of the container 15 being situated in the recesses 53 in the outer wall 47 of the support 21, enabling the container 15 to be coupled to the support 21 by means of the closing member 39. In this state, the further locking element 77' is displaced with respect to the closing member 39 by one of the positioning elements 51, referred to as displacement element 81 in FIG. 1, from its first position to its second position, in which the further locking element 77' releases the closing member 39 with respect to the support 21. By using the further locking element 77, it is achieved that the closing member 39 can only be rotated to its second position by the user if the container 15 is in a position, relative to the support 21, wherein the container 15 can be properly coupled to the support 21. As a result thereof, it is achieved that the user cannot, unintentionally or intentionally, release the safety member 31 by rotating the closing member 39 from its first position to its second position if the container 15 is not properly arranged relatively to the support 21.

As described hereinabove, all parts which are necessary according to the invention to obtain the above-described safety of the accessory 13 are arranged on the accessory 13 itself. The main part of the food processor, which comprises the housing 1, the motor 5 and the drive member 9, does not require special adaptations. This has the advantage that the above-described safety of the accessory 13 in accordance with the invention is also obtained if the accessory 13 is used in combination with existing food processors.

The above-described accessory 13 in accordance with the invention includes an annular safety member 31 which in its first position entirely surrounds the coupling member 27 of the accessory 13. It is noted that an accessory in accordance with the invention may also be provided with a different type of safety member which, in its first position, precludes coupling of the coupling member to the drive member of the food processor. Such a different type of safety member could be, for example, an elongated or plate-shaped safety member which, in its first position, is arranged next to the coupling member, parallel to the axis of rotation of the coupling member, and which can be rotated, from its first position to its second position, about a tilt axis extending transversely to the axis of rotation of the coupling member. An accessory in accordance with the invention may additionally be provided with a different type of locking device for co-operation with the safety member. An example of such a different type of locking device could be a locking device which does not co-operate with a closing member as described hereinabove, but which instead co-operates directly with a detector which detects the presence of the container on the support.

What is claimed is:

1. An accessory for a food processor, which comprises:
a tool,
a support in which the tool is rotatably journalled,
a coupling member by means of which the tool can be coupled to a drive member of the food processor,
a container which is detachably coupled to the support,
an annular safety member which is displaceable relatively to the coupling member from a first position, in which the safety member precludes coupling of the coupling member to the drive member, to a second position in which the safety member permits coupling of the coupling member to the drive member, and
a locking device which co-operates with said safety member to lock the safety member in its first position when the container is uncoupled from the support, and to release the safety member when the container is coupled to the support,
wherein in the first position of the annular safety member, the coupling member is surrounded by the annular safety member, and in the second position of the annular safety member the coupling member projects from the safety member.

2. An accessory as claimed in claim 1, wherein the safety member is displaceable, in a direction parallel to an axis of rotation of the coupling member, from its first position to its second position.

3. An accessory as claimed in claim 1, wherein (1) when the container is not coupled to the support, the safety member is locked in its first position in which position the coupling member is surrounded by the safety member and cannot be coupled to the drive member, and (2) when the container is coupled to the support, the locking device releases the safety member and the coupling member is displaceable, either manually or by contact with the housing of the food processor, in a direction parallel to the axis of rotation of the coupling member, to its second position allowing the coupling member to be coupled to the drive member of the food processor.

4. An accessory as claimed in claim 1, wherein the locking device includes a closing member which is displaceable relatively to the support by a user of the accessory, from a first position in which the container is detachable from the support to a second position in which the closing member couples the container to the support, and a locking element which is provided on the support to co-operate with the safety member, said safety member being displaceably guided, relatively to the closing member, between its first position and its second position, and wherein the locking element locks the safety member in its first position if the closing member is in its first position, and releases the safety member if the closing member is in its second position.

5. An accessory as claimed in claim 4, wherein the locking device comprises a further locking element which, with respect to the closing member, is displaced from a first position, in which the further locking element locks the locking member in its first position, to a second position, in which the further locking element releases the closing member, the further locking element co-operating with a displacement element provided on the container, which displacement element displaces the further locking element to its second position when the container is in a position relative to the support in which the container can be coupled to the support by means of the closing member.

6. An accessory as claimed in claim 4 wherein, between its first position and its second position, the closing member is rotatably guided, relatively to the support, about the axis of rotation of the coupling member, and wherein the locking element includes a cam which is provided with a profile which extends in a tangential direction relatively to the axis of rotation and extends obliquely relatively to said tangential direction.

7. An accessory as claimed in claim 4, wherein an outer wall of the closing member is provided with a number of spaced recesses which, in the first position of the closing member, viewed parallel to the axis of rotation, are situated in line with a corresponding number of recesses formed in an outer wall of the support.

8. An accessory as claimed in claim 7, wherein, in the first position of the closing member, the support can be placed in the container by sliding the recesses over a number of projections on an inner wall of the container, the number of projections corresponding to the number of recesses.

9. An accessory as claimed in claim 8, wherein, as a result of sliding said recesses in the outer wall of the closing member over the projections in the inner wall of the container, a number of positioning elements provided on the inner wall of the container are placed in a number of recesses formed in the outer wall of the support.

10. An accessory as claimed in claim 9, wherein the support can subsequently be coupled to the container by rotating the closing member relatively to the support from the first position to the second position, thereby causing the support with the closing member to be retained between the projections and a retaining ring provided on the inner wall of the container.

11. An accessory as claimed in claim 1, wherein:
the annular safety member includes a number of guiding projections which are each provided on a tongue of the safety member, said guiding projections guiding said safety member, relatively to the closing member, between its first position and its second position.

12. An accessory as claimed in claim 11, wherein an inner wall of the closing member is provided with a number of guiding channels which extend parallel to the axis of rotation, and co-operate with the guiding projections of said safety member to couple said safety member to said closing member.

13. An accessory as claimed in claim 12, wherein the closing member is rotatable by the user between its first position and its second position by rotating the safety member about the axis of rotation of the coupling member, said rotation of the safety member also being effective to couple the support to the container.

14. An accessory as claimed in claim 11, wherein, said tongues of the safety member each co-operate with a locking element of the locking device, said locking elements being provided on an inner sleeve of the support and each including a cam which is provided with a profile which, with respect to the axis of rotation, extends in a tangential direction and is positioned obliquely relatively to said tangential direction, wherein when the closing member is in its first position in which the support can be detached from the container, the safety member, viewed in the direction of rotation of the closing member, is coupled to said closing member, the tongues of the safety member bear against a first end of the profile of the cams, so that the safety member 31 is locked in its first position by the locking elements.

15. An accessory as claimed in claim 14, wherein when the closing member is in its second position in which the support is coupled to the container, the safety member, viewed in the direction of rotation of the closing member, is coupled to said closing member, the tongues of the safety member can be displaced in a direction parallel to the axis of rotation until they contact a second end of the profile of the cams, so that the locking elements release the safety member and said safety member is displaced, parallel to the axis of rotation, between its first position and its second position.

16. A food-processor which comprises an accessory as claimed in claim 11.

17. A food-processor which comprises an accessory as claimed in claim 1.

\* \* \* \* \*